United States Patent [19]

Yamanaka

[11] Patent Number: 5,254,302
[45] Date of Patent: Oct. 19, 1993

[54] METHOD OF PREPARING AN IN-MOLD LABEL

[75] Inventor: Masaaki Yamanaka, Ibaraki, Japan

[73] Assignee: Oji Yuka Goseishi Co., Ltd., Tokyo, Japan

[21] Appl. No.: 845,256

[22] Filed: Mar. 3, 1992

[30] Foreign Application Priority Data

Mar. 4, 1991 [JP] Japan ................. 3-062722

[51] Int. Cl.⁵ .............................. B05D 5/10
[52] U.S. Cl. ..................... 264/129; 156/209; 156/220; 156/229; 264/291; 264/509; 427/372.2
[58] Field of Search ........... 264/129, 291, 293, 509, 264/132; 156/209, 220, 229; 427/133, 171, 226, 372.2, 377, 385.5

[56] References Cited

U.S. PATENT DOCUMENTS

| | | | |
|---|---|---|---|
| 3,765,999 | 10/1973 | Toyoda | 264/291 X |
| 3,783,088 | 1/1974 | Yoshiyasu et al. | 264/291 X |
| 3,993,718 | 11/1976 | Bontinck et al. | 264/171 X |
| 4,986,866 | 1/1991 | Ohba et al. | 156/220 |
| 5,069,953 | 12/1991 | Kishikawa et al. | 156/229 X |
| 5,100,491 | 3/1992 | Ijiri et al. | 156/220 |
| 5,139,590 | 8/1992 | Wyckoff | 156/209 X |

Primary Examiner—Richard L. Chiesa
Attorney, Agent, or Firm—Sughrue, Mion, Zinn, Macpeak & Seas

[57] ABSTRACT

A method of preparing an in-mold label is described in which a resin film is embossed to form a gravure pattern having from 60 to 200 roll-formed lines per inch. The embossed film is stretched and then coated on its embossed pattern side with a heat-sensitive liquid resinous adhesive in an amount of from 1 to 10 g/m² on a dry resin basis. The applied adhesive is then dried to form an adhesive layer on the film. The in-mold label obtained by the present invention is excellent in printing suitability including feeding properties and ink adhesion, has an advantage that die-cutting for producing the label can be conducted at a high efficiency, and is less apt to develop blisters even under a wide range of molding conditions when used in in-mold application.

4 Claims, 4 Drawing Sheets

METHOD OF PREPARING AN IN-MOLD LABEL

FIELD OF THE INVENTION

The present invention relates to a method of preparing an in-mold label which has an excellent printing suitability including feeding properties and ink adhesion, and also has an advantage that die-cutting for producing the label can be conducted at a high efficiency, and which, when used in in-mold application, is less apt to develop blisters even under a wide range of molding conditions.

BACKGROUND OF THE INVENTION

In a conventional process for producing a labeled, synthetic resin molded article by integral molding (in-mold labeling), printing is first conducted on a base consisting of a stretched or unstretched extruded film of crystalline polypropylene, a cast film of crystalline polypropylene, a synthetic paper, a metal foil, or the like. Subsequently, the printed base is laminated on its back side with a film of a low-melting resin, such as a low-density polyethylene, an ethylene-vinyl acetate copolymer, or the like, by direct extrusion laminating, or the printed base is coated on the back side with a solvent-based adhesive prepared by dissolving a low-melting resin, such as poly(vinyl acetate), an ethylene-vinyl acetate copolymer, or the like, in a solvent or with a latex-type adhesive (liquid resinous adhesive of a heat-sensitive type) by means of a gravure coater or the like and the coating is then dried, thereby to produce a label of a laminated structure. This label is then placed beforehand on an inner wall of a mold, and a molding resin such as polypropylene, polyethylene, or other resin is fed directly to the cavity of the mold and shaped by means of injection molding, blow molding, in-mold bead-foaming molding, or the like (European Patents 254,923 and 281,701, U.S. Pat. Nos. 4,837,075 and 4,986,866, and JP-A-58-69015). (The term "JP-A" as used herein means an "unexamined published Japanese patent application".)

Also in the case of applying a laminated-structure label of the above kind to the surface of a cup-type molded article obtained by shaping a polypropylene or polyethylene resin sheet, substantially the same procedure has been employed, that is, the label is inserted into a mold and the resin sheet in a heated state is then shaped into a cup in the mold by means of differential pressure forming utilizing a pressure difference (vacuum forming or pressure forming).

On the other hand, in retail stores and the like as the final stage of distribution, labeling for displaying a bar code, a dealer name, or other information on contents-filled containers to be sold as goods is being practically conducted by placing a laminated-structure label printed with a bar code, a dealer name, or other information on the surface of such a container or a package therefor, e.g., bag, and then pressing the label with a heated iron or the like to heat-bond the label to the container or package.

The label base, which usually is a synthetic paper or a converted paper prepared by coating a film with a pigment, has undergone a surface-smoothing treatment such as calendering or stretching so as to attain good finish of prints to be obtained therefrom. An in-mold label is prepared by laminating a hot melt resin adhesive film having a low-melting point directly to the base, and then embossing the thus-formed hot melt resin adhesive layer with an embossing roll in order to easily feed the label to a cavity of a mold by means of an insertor and to prevent the occurrence of blistering on labeled molded articles (U.S. Pat. No. 4,986,866). Man can hit a use of an organic solvent-based adhesive in place of hot melt resin adhesive. It is coated on the base and dried to form an adhesive layer, and then the adhesive layer is embossed to bear a gravure pattern on its surface.

Although it has been attempted to form such a liquid-based adhesive layer by coating a water-based resinous adhesive such as, for example, an aqueous latex or emulsion to the base in place of the hot melt resin adhesive, it has been impossible to form an embossed or gravure pattern or a similar pattern on the surface of the adhesive layer.

Because of the above, in-mold labels having an adhesive layer formed by coating such a water-based adhesive have had a problem that containers to which such labels can be applied are limited in shape, because such in-mold labels are more apt to develop blisters when used in in-mold application as compared with the label having an adhesive layer with an embossed surface and the label having an adhesive layer formed from an organic solvent-based adhesive and bearing a gravure pattern.

SUMMARY OF THE INVENTION

With a view to overcoming the above-described problems, the present inventor has made extensive and intensive studies. As a result, it has been found that an in-mold label obtained by forming a specific embossed pattern beforehand on a base and providing thereon an adhesive layer having a thickness in a specific range can possess an embossed pattern comparable to those of conventional in-mold labels even where the adhesive layer has been formed from a water-based adhesive, and that this in-mold label can be used in in-mold application without developing blisters under a wide range of molding conditions. The present invention has been completed based on this finding.

Accordingly, an object of the present invention is to provide a method of preparing an in-mold label which has excellent printing suitability, has an advantage that die-cutting for producing the label can be conducted at a high efficiency, and is less apt to develop a blister when used in in-mold application even under a wide range of molding conditions.

The present invention provides a method of preparing an in-mold label which comprises, at first embossing a resin film to form a gravure pattern comprising from 60 to 200 roll-formed lines per inch, secondly stretching the embossed film, thirdly coating the stretched film on its embossed pattern side with a liquid resinous adhesive of a heat-sensitive type in an amount of from 1 to 10 g/m² on a dry resin basis, and finally drying the applied adhesive to form an adhesive layer on the film.

DETAILED DESCRIPTION OF THE PREFERRED EMBODIMENT

[I] In-Mold Label

(1) Constituent Layers

Figure 1:
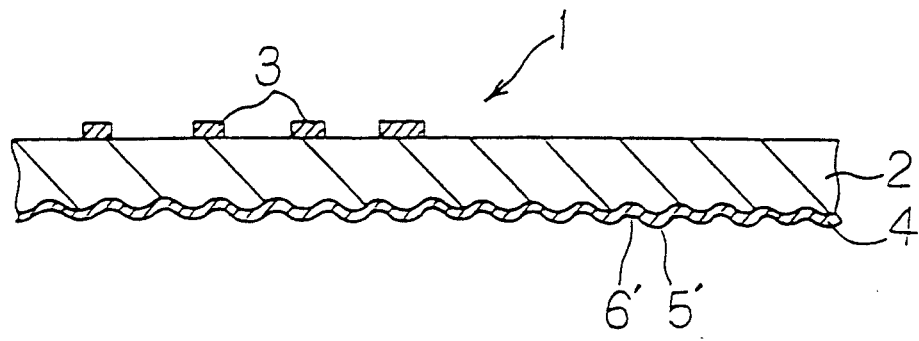
FIG. 1 is a sectional view of one embodiment of the in-mold label obtained by the present invention.

The multilayer in-mold label obtained by the present invention has a multilayer structure consisting of at least two layers basically including a stretched film base and a heat-sensitive adhesive layer. The film base has been embossed with a pattern and may bear a print. This film base may be formed so as to have a multilayer structure consisting of two or more layers.

(a) Base

The base in the in-mold label obtained by the present invention may, for example, be a film of a thermoplastic resin having a melting point of from 135° to 264° C., e.g., polypropylene, high-density polyethylene, poly(vinyl chloride), poly(ethylene terephthalate), and polyamides, or a film of a resin consisting of from 92 to 35% by weight, preferably from 90 to 45% by weight, of such a thermoplastic resin and from 8 to 65% by weight, preferably from 10 to 55% by weight, of an inorganic fine powder incorporated in the resin.

The base may consist of a single layer or may have a laminated structure consisting of two or more layers (JP-B-46-40794). (The term "JP-B" as used herein means an "examined Japanese patent publication".) Further, the base may also be a resin film which has been stretched monoaxially or biaxially, or may be a laminate of such stretched films.

In general, the base is decorated with a print on its side to be brought into contact with a mold. If required and necessary, a transparent film may be further laminated to such a decorated base on the print side to give a multilayer film base.

The other side of the base which is the side to be in contact with a container is embossed by means of a metallic roll and a rubber roll. This metallic roll has on its surface an embossing pattern which can emboss, into the base, a reverse-gravure pattern in which the number of dots or lines is from 60 to 200 per inch (2.54 cm). The embossed base is then stretched at least monoaxially at a stretch ratio of normally from 3 to 12, preferably from 4 to 8, thereby elongating the embossed pattern in the stretch direction.

It is desirable that after the stretching, the embossed pattern on the base film should consist of top parts defined as those parts of the embossed film surface which are elevated above a center line L which is the imaginary line extending at an equal distance (i.e., h/2, where h is the height of the tops as measured from the valley bottoms) from the tops and the valleys of the pattern and of valley parts defined as those parts of the embossed film surface which are depressed below the center line L, the top parts having a surface area comprising from 50 to 90%, preferably from 55 to 80%, of the area of all the embossed film surface, the valley parts having an average depth $L_1$ as measured from the center line L of from 1 to 15 μm, preferably from 2 to 10 μm.

(b) Adhesive Layer

On the embossed side (the side to be in contact with a resin container) of the above-described stretched resin film as the base, a heat-sensitive adhesive layer is formed by coating a liquid resinous adhesive of a heat-sensitive type on the embossed surface in an amount of from 1 to 10 g/m$^2$ (in terms of the amount of solid resin) and then drying the applied adhesive. The liquid adhesive used above may be an emulsion or solution of a low-melting resin having a melting point of from 85° to 135° C. Examples of such a low-melting resin include vinyl acetate-ethylene copolymers, ethylene-acrylic acid copolymers, ethylene-methacrylic acid copolymers, and metal salt (Li+, K+, Na+, Zn++, Al+++) of ethylene-methacrylic acid copolymer.

The adhesive layer may be formed either on only the top parts of the embossed base surface or over the whole surface including the top parts and valley parts.

As the solvent for dissolving the low-melting resin, toluene, mineral spirit, petroleum ether, or the like may be used. It is preferred that the viscosity of the liquid resinous adhesive at 25° C. be in the range of from 20 to 300 cps.

It is preferable that the adhesive layer has a Bekk's surface smoothness (JIS P-8119) of generally from 20 to 800 seconds, an average three dimensional surface roughness (SRa) of generally 0.5 to 5 μm, thickness of generally 0.5 to 10 μm and an average depth ($h_1'$) which is the height of the tops as measured from the valley bottoms of generally 1 to 10 μm. It is desirable that the adhesive layer should consist of top parts defined as those parts of the adhesive layer surface which are elevated above a center line which is the imaginary line extending at an equal distance (i.e., $h_1'/2$) from the tops and the valleys of the adhesive layer and of valley parts defined as those parts of the adhesive layer surface which are depressed below the center line, the top parts having a surface area comprising from 55 to 95% of the area of all the adhesive layer surface.

(2) Construction

The in-mold label obtained by the present invention is explained below in detail with respect to its construction by illustrating an in-mold label for blow-molded containers, as a representative example thereof.

FIG. 1 is a sectional view of a two-layer in-mold label for use in blow molding, as one example of the in-mold label obtained by the present invention.

Figure 2:
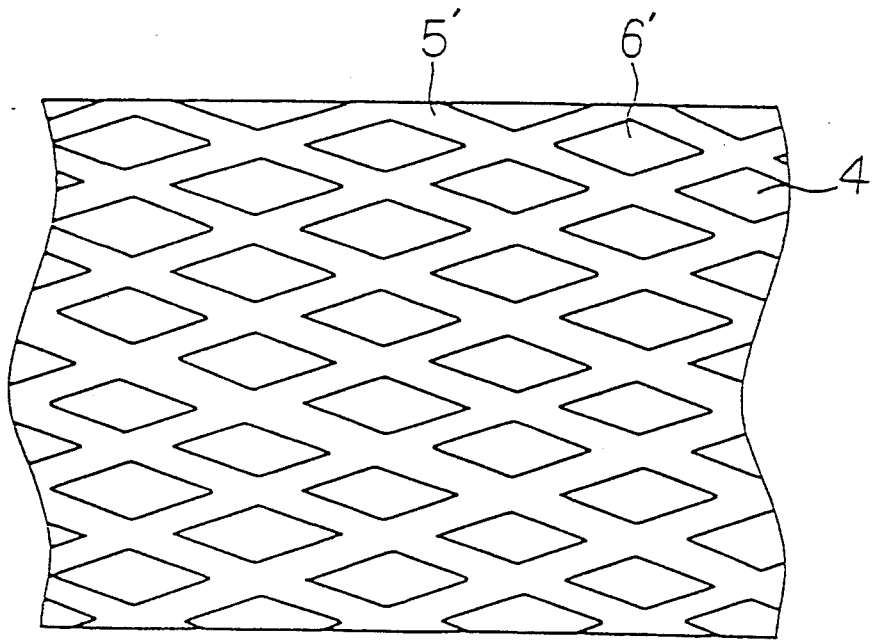
FIG. 2 is a plan view of the adhesive layer side of the in-mold label of FIG. 1.

In FIG. 1, numeral 1 denotes an in-mold label obtained by the present invention, 2 a base consisting of a stretched thermoplastic resin film, 3 a print, and 4 an adhesive layer formed by coating a heat-sealable resin. Further, 5' denotes the top of a top part in a lattice pattern formed on the adhesive layer 4 made of a heat-sealable resin, and 6' denotes a valley part in the lattice pattern. FIG. 2 is a plan view of the adhesive layer 4 side of the above in-mold label, which adhesive layer has been formed by coating and drying a heat-sealable resin.

Figure 3:
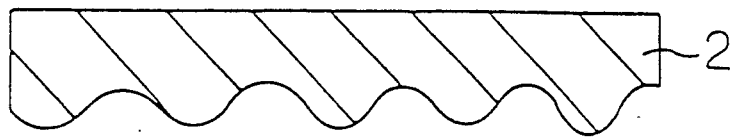
FIG. 3 is an enlarged sectional view of part of a stretched base on one side of which an embossed pattern has been formed.
Figure 4:
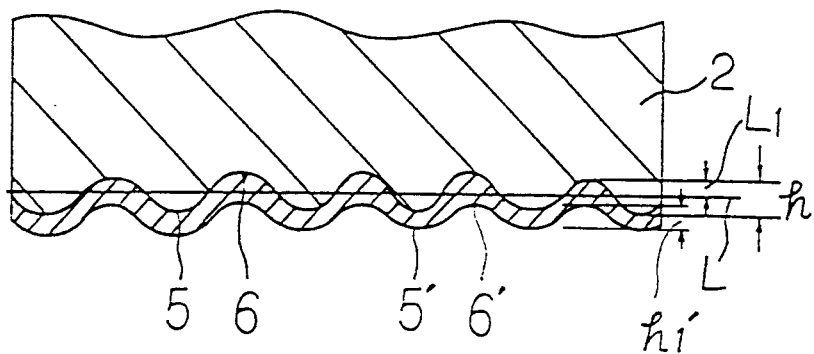
FIG. 4 is an enlarged sectional view of part of an in-mold label obtained by forming an adhesive layer on the embossed side of the base of FIG. 3.

FIG. 3 is an enlarged sectional view of part of a stretched base on one side of which an embossed pattern has been formed, and FIG. 4 is an enlarged sectional view illustrating part of an in-mold label consisting of the base of FIG. 3 and an adhesive layer formed thereon by coating the embossed surface of the base with an adhesive in an amount of 5 g/m² on a dry basis in terms of the amount of the adhesive present on the tops of the top parts in the embossed pattern on the base.

As shown in FIG. 4, the pattern embossed into the base film remains even after the coating of an adhesive thereon. When the final in-mold label is used in in-mold application in blow molding, the embossed pattern transferred to the adhesive layer surface can prevent the occurrence of blistering because it possesses spaces of a volume sufficient to trap the air or gas resulting from the blow molding.

In the embossed pattern formed on the base, the valley parts have an average depth as measured from the center line of generally from 1 to 15 $\mu$m, preferably from 2 to 12 $\mu$m. It is preferred that the adhesive to be coated on the embossed surface be a solution-type adhesive having a solid content of from 10 to 50% by weight. In order to enable the final in-mold label to show good adhesion when used for in-mold application in blow molding, it is important and necessary that the applied amount of the adhesive be regulated so that the thickness of the applied solution-state adhesive as measured from the tops 5 of the top parts in the embossed pattern on the base is from 5 to 50 $\mu$m, preferably from 10 to 30 $\mu$m, and drying of such a wet adhesive coating gives an adhesive layer which covers the embossed pattern in an amount of from 1 to 10 g/m² in terms of the amount of the dry adhesive present on the tops 5 of the top parts. If the adhesive is applied in an amount below the lower limit, the adhesion between the resulting label and a hollow container is impaired and the label is unable to follow the shrinkage of the container after blow molding, so that the applied label is apt to peel off and this may be a cause of blistering. On the other hand, if the amount of the dried adhesive layer in terms of the adhesive amount on the tops 5 of the top parts exceeds the upper limit specified above, the embossed pattern formed on the base disappears almost completely and the adhesive layer comes to have a flat surface, so that the resulting label cannot provide, at the interface between the label and container, sufficient spaces for traping the gas or air resulting from blow molding and, hence, the occurrence of blistering cannot be prevented.

From the standpoints of adhesion strength and prevention of blistering, it is preferable that the adhesive layer has a Bekk's surface smoothness (JIS P-8119) of generally from 20 to 800 seconds, preferably from 30 to 400 seconds, and an average three dimensional surface roughness (SRa) of generally from 0.5 to 5 $\mu$m, preferably from 0.8 to 3 $\mu$m.

[II] Production of In-Mold Label (1) Preparation of Base

The base for use in producing the in-mold label may be a film of a thermoplastic resin having a melting point of from 135° to 264° C., such as those enumerated hereinabove or a film of a resin obtained by incorporating into such a thermoplastic resin an inorganic fine powder in an amount of from 8 to 65% by weight, preferably from 10 to 55% by weight, based on the total amount of the thermoplastic resin and the powder. Further, the base may also be a single-layer film such as a stretched film obtained by monoaxially stretching the above resin film, or may be a laminate obtained by laminating two or more such films.

(2) Embossing

One side of the above-described base is embossed with a metallic roll and rubber roll which have been designed so as to be able to emboss a reverse-gravure pattern comprising from 60 to 200 dots or lines per inch (2.54 cm).

The thus-formed embossed pattern preferably is a reverse-gravure pattern having a plurality of depressed parts each independently surrounded by a ridgeline.

(3) Stretching

The embossed resin film is heated to a temperature usually 1° to 10° C. lower than the melting point of the resin, and the film being heated is stretched at least monoaxially at a stretch ratio of normally from 3 to 10, preferably from 4 to 8. It is preferred that the monoaxially stretched film be further stretched in a direction perpendicular to the direction of the first stretching at a stretch ratio of from 3 to 12, preferably from 4 to 10. The stretching described above is carried out at a temperature below the melting point of the resin constituting the base. By this stretching, polymer molecules in the resin are oriented and a large number of microvoids are formed. As a result, whiteness and opaqueness are imparted to the final label to be obtained and, at the same time, the label can have improved printing suitability and nerve, which is necessary in in-mold application for smooth label insertion into a mold.

(4) Other Treatments

If required, both sides of the stretched film may be subjected to a surface treatment, such as corona discharge treatment or coating of an antistatic agent, to improve printability, ink adhesion, and adhesive bondability.

(5) Formation of Adhesive Layer

A heat-sensitive adhesive layer is then formed on the resin film base on the embossed side (the side to be in contact with a resin container) by coating an adhesive which is an emulsion, latex, or aqueous solution of a heat-sealable resin having a melting point of from 85° to 135° C. in an amount of from 1 to 10 g/m² on a dry basis by means of a roll coater, gravure printing machine, offset printing machine, or the like selected from various kinds. The adhesive may also be a solution of the heat-sealable resin in an organic solvent or the like.

The adhesive layer is formed on the base on its side having an embossed pattern. Although the adhesive to be used may be either water-based or organic solvent-based, it is preferable that the adhesive have a resinous solid content in the range of from 10 to 50% by weight and it is important that the adhesive be applied in such an amount that the thickness of the applied solution-state or emulsion-state adhesive as measured from the tops of the top parts in the embossed pattern on the base is 5 μm or more. This is because the adhesive layer is required to have a dry thickness of 0.5 μm or more on the tops of the top parts in the embossed pattern in order to attain good adhesion between the label and a container.

(6) Die-Cutting

After the adhesive layer formation, the resulting label for containers which bears a print is cut into a desired shape and size by die-cutting. Although the cut label may have a small size for covering only a part of the surface of a container, the die-cutting usually is conducted so as to produce a blank to be applied around the side wall of a cup-type container in differential pressure forming or so as to produce a label to be applied on the front and back side of a bottle-type container in blow molding.

[III] In-Mold Application

The thus-produced label, which has the construction as described above, can be used as an in-mold label in differential pressure forming such as vacuum forming or pressure forming, blow molding in which compressed air is fed into a parison which expands to fill the mold, injection molding in which a molten resin is shaped by injecting it into a mold, and in other molding techniques.

In practicing such molding to apply the in-mold label to a container to be produced, the label is placed in the cavity of the mold in such a manner that the print side of the label is in contact with an inner wall of the mold, and the label is then fixed to the inner wall by evacuating the mold. Subsequently, a sheet-form melt of a resin as the container-forming material is introduced into the mold and shaped by an ordinary method, thereby to produce a container to the outer wall of which the label has been united by melt-bonding.

Since the thus-obtained labeled resin container has been produced by molding the molten resin integrally with the label after fixing of the label to an inner wall of the mold, it is free from label deformation or blistering, shows tenacious adhesion between the container body and the label, and has a good label-decorated appearance.

As described above, the in-mold label obtained by a method comprising forming an embossed pattern on a base beforehand and providing an adhesive layer on the base on its embossed side, has an advantage that in producing the label, the desired embossed pattern can be easily imparted to the label by uniformly coating onto the embossed base surface with an liquid-type resin adhesive and drying the coated adhesive, without the necessity of regulating adhesive viscosity and drying conditions, which has been requisite in conventional gravure coating or the like in order to obtain an adhesive layer which, even after being dried, retains a gravure pattern transferred from the coating roll surface.

Further, although it has so far been difficult to form a gravure pattern-bearing adhesive layer from a water-based adhesive by gravure coating, the in-mold label can retain an embossed pattern on the adhesive layer surface even where the adhesive layer has been obtained from a water-based adhesive as in the case of using a solvent-based adhesive.

The reason why the adhesive layer obtained by coating an adhesive is required to have such an embossed pattern is that when the label is used for in-mold application, the embossed pattern serves to prevent the occurrence of blistering by allowing the air present in the space between the container resin and the label to escape in a moment or by dispersing the air or gas and trapping it in depressed parts thereof. The embossed pattern in the in-mold label obtained by the present invention is effective particularly where the label is applied to a specially designed container having a unique shape or where molding is conducted at a high resin temperature to yield a decomposition gas in a large amount.

The present invention will be illustrated below in more detail with reference to the following Examples and Comparative Examples, but the invention is not construed as being limited to these Examples.

In the Examples and Comparative Examples, labeled containers were evaluated according to the following criteria.

Blistering

Degrees of blistering were divided into the following five grades based on the percentage of bonding area.

5: The whole area of the label is adherent.
4: Below 100% but not less than 90% of the label is adherent.
3: Below 90% but not less than 70% of the label is adherent.
2: Below 70% but not less than 50% of the label is adherent.
1: Below 50% of the label is adherent.

Bond Strength of Label

The bond strength of applied labels per 15-mm width was measured by T-type peeling.

Orange Peel o: No orange peel occurred.
Δ: A slight orange peel occurred.
x: A considerable orange peel occurred.

EXAMPLE 1

(1) Production of In-Mold Label

Preparation of Base

Compound A as a base-forming resin was prepared by mixing 70% by weight of propylene homopolymer having a melt flow rate (MFR) of 0.8 g/10 min and a melting point of 164° C., 12% by weight of high-density polyethylene having a melting point of 134° C., and 18% by weight of heavy calcium carbonate having an average particle diameter of 1.5 μm. This compound A was kneaded in an extruder at 270° C., extruded into a sheet form, and then cooled with a cooling device, thereby obtaining an unstretched sheet.

This sheet was heated to 145° C. and then longitudinally stretched at a stretch ratio of 5, thereby obtaining a stretched sheet (layer A) longitudinally stretched 5 times.

On the other hand, compound B consisting of 58% by weight of propylene homopolymer having an MFR of 4.0 g/10 min and 42% by weight of calcium carbonate having an average particle diameter of 1.5 μm was kneaded in an extruder at 270° C., fed to a die, and then extruded therethrough onto the back side of the above-obtained stretched sheet (layer A), thereby to form layer B. The resulting two-layer laminate was passed through embossing rolls comprising a combination of a metallic roll and a rubber roll, thereby to emboss a reverse-gravure pattern into the two-layer laminate on its back side (layer B side). This embossed pattern comprised 150 lines per inch with a valley part depth of 35 μm.

The above-described compound B was further laminated to the embossed two-layer laminate on its front side, i.e., on the layer A side, thereby to form layer B' on the laminate. Thus, a three-layer laminate (B'/A/B) was obtained.

This three-layer laminate was heated to about 155° C. and then transversely stretched at a stretch ratio of 7. Both sides of the stretched laminate were subjected to corona discharge treatment. The resulting laminate was then cooled to 55° C. and trimmed, thereby obtaining a base sheet.

Formation of Adhesive Layer

The base sheet was coated on its embossed pattern side (layer B side) with an ethylene-vinyl acetate copolymer dispersion (trade name, ADCOTEX 37T77; manufactured by Toyo Morton Ltd.) as a water-based heat-sealing adhesive by means of a rod coater employing a #8 Mayer bar. The coating was dried in an oven at 60° C. to form an adhesive layer.

The surface of this adhesive layer was examined with a surface roughness meter [Surfcorder SE-30 (trade name), manufactured by K. K. Kosaka Kenkyusho, Japan]. As a result, the adhesive layer was found to have an average three dimensional surface roughness (SRa) of 2.0 μm, a Bekk's surface smoothness of 50 seconds, and thickness of 1.2 μm.

Further, the base sheet on which the adhesive layer had been formed was printed on its layer B' side by offset printing and then die-cut, thereby to obtain an in-mold label having a width of 60 mm and a length of 110 mm.

(2) Label Application

The thus-obtained in-mold label was fixed, by suction, to the inner wall of one of the parts of a split mold for blow molding, with the print side (layer B' side) being in contact with the mold.

Subsequently, high-density polyethylene (melting point; 134° C.) was melt-extruded at 155° C. to form a parison (low-temperature parison), and the split mold was closed around the parison. Compressed air of 4.2 kg/cm$^2$ was then fed into the parison, whereby the parison was expanded to a container shape and, at the same time, the label was melt-bonded to the container. Thereafter, the mold was cooled and then opened to obtain a hollow container. The same procedure as the above was repeated except that the polyethylene was melt-extruded at 205° C. to form a parison (high-temperature parison), thereby obtaining another hollow container.

(3) Evaluation

The labels on the above-obtained hollow containers showed no shrinkage or blistering.

Further, label feeding to the split mold for blow molding was consecutively conducted 100 times by use of an automatic label feeder. As a result, all the labels were successfully fed without falling off the mold.

The hollow containers obtained respectively from the low-temperature parison and the high-temperature parison were evaluated with respect to blistering, label bond strength, and orange peel. The results obtained are shown in Table 1.

Figure 5:
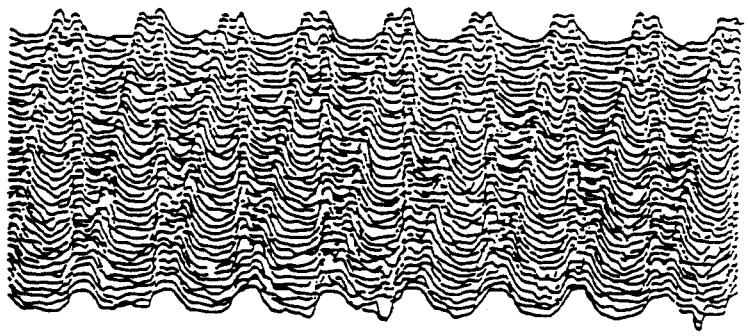
FIG. 5 is a view illustrating the film surface which was embossed in Example 1 of the present invention to form thereon a reverse-trapezoidal gravure pattern comprising 150 lines per inch.
Figure 6:
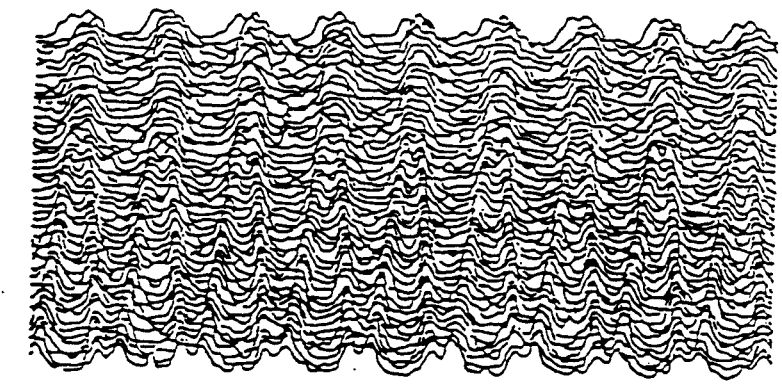
FIG. 6 is a view illustrating a film surface obtained by coating the film surface of FIG. 5 with an adhesive at a spread rate of 1.2 g/m$^2$.

Moreover, the surface structure of the base film before adhesive coating and the surface structure of the label after adhesive coating were examined with Surfcorder SE-30K manufactured by K. K. Kosaka Kenkyusho. The surface structures determined are shown as drawings in FIGS. 5 and 6, respectively.

TABLE 1

| | Label | | | | | Evaluation | | | | |
| --- | --- | --- | --- | --- | --- | --- | --- | --- | --- | --- |
| | Base film | Adhesive layer | | | | Blistering | | Bond strength (g/15 mm) | | |
| | Number of embossed lines | Adhesive Kind | Amount (g/m$^2$) | Bekk index (seconds) | SRa (μm) | Low-temperature conditions | High-temperature conditions | Low-temperature conditions | High-temperature conditions | Orange peel |
| Example 1 | 150 per inch | water-based ADX37T77 | 1.2 | 50 | 2.0 | 5 | 5 | 250 | 350 | Δ |
| Example 2 | 150 per inch | water-based ADX37T77 | 5 | 200 | 1.5 | 5 | 5 | 450 | 530 | O |
| Example 3 | 150 per inch | water-based ADX37T77 | 9.5 | 800 | 0.8 | 5 | 5 | 550 | 550 | O |
| Example 4 | 100 per inch | water- | 5.5 | 150 | 1.7 | 5 | 5 | 400 | 550 | O |
| Example 5 | 100 per inch | organic solvent-based AD 33P5 | 5.3 | 180 | 1.8 | 5 | 5 | 350 | 500 | O |
| Example 6 | 60 per inch | water-based ADX37T77 | 8.5 | 30 | 2.5 | 5 | 5 | 310 | 580 | Δ |
| Comp. Example 1 | none | water-based ADX37T77 | 1.5 | 1000 | 0.4 | 2 | 3 | 30 | *500 | O |
| Comp. Example 2 | " | water-based ADX37T77 | 9.0 | 1200 | 0.35 | 4 | 2 | 400 | *550 | O |
| Comp. Example 3 | 150 per inch | water-based ADX37T77 | 0.6 | 10 | 6.0 | 3 | 4 | 20 | 80 | X |
| Comp. Example 4 | 150 per inch | water-based | 11.0 | 900 | 0.45 | 4 | 3 | *580 | *580 | O |

TABLE 1-continued

| Label | | | | Evaluation | | | | |
| --- | --- | --- | --- | --- | --- | --- | --- | --- |
| Base film | Adhesive layer | | | Blistering | | Bond strength (g/15 mm) | | |
| Number of embossed lines | Adhesive | | Bekk index (seconds) | Low-temperature conditions | High-temperature conditions | Low-temperature conditions | High-temperature conditions | Orange peel |
| | Kind | Amount (g/m²) | | | | | | |
| | ADX37T77 | | | | | | | |

*Label was broken during peeling.

EXAMPLES 2 TO 6 AND COMPARATIVE EXAMPLES 1 TO 4

In-mold labels were produced and evaluated in the same manner as in Example 1 except that the structure of the embossed pattern on the base and the kind and applied amount of the adhesive were changed as shown in Table 1.

The results obtained are summarized in Table 1.

Figure 7:
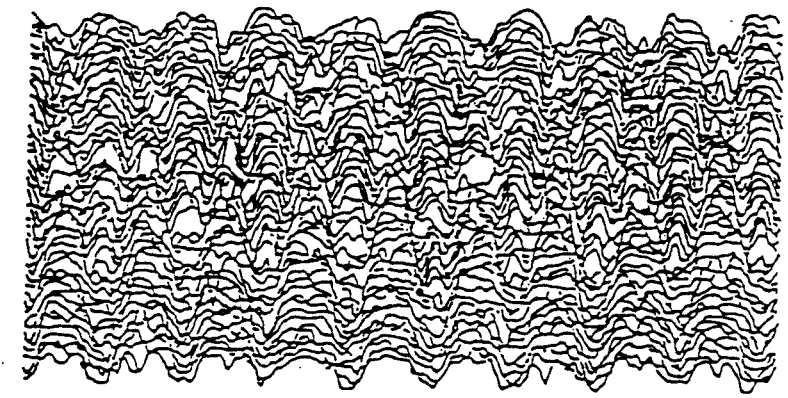
FIG. 7 is a view illustrating the film surface obtained in Example 2 by coating the film surface of FIG. 5 with an adhesive at a spread rate of 5 g/m$^2$.

Further, the surface structure of the label of Example 2 which had undergone adhesive coating after transverse stretching was examined. The surface structure determined is shown as a drawing in FIG. 7.

Figure 8:
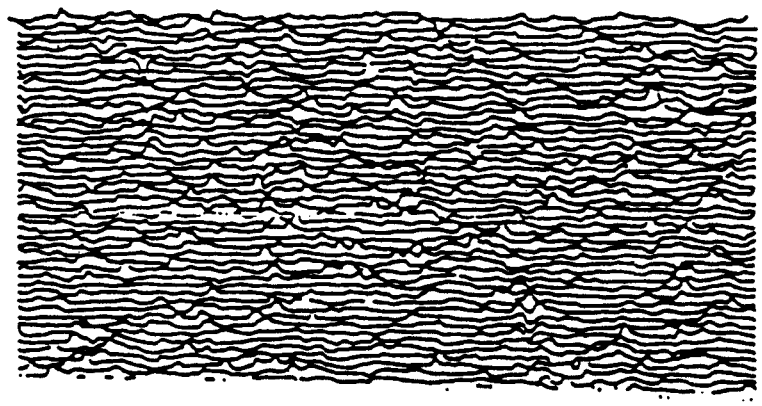
FIG. 8 is a view illustrating the surface of the conventional base film used in Comparative Example 1, the surface having no embossed pattern.
Figure 9:
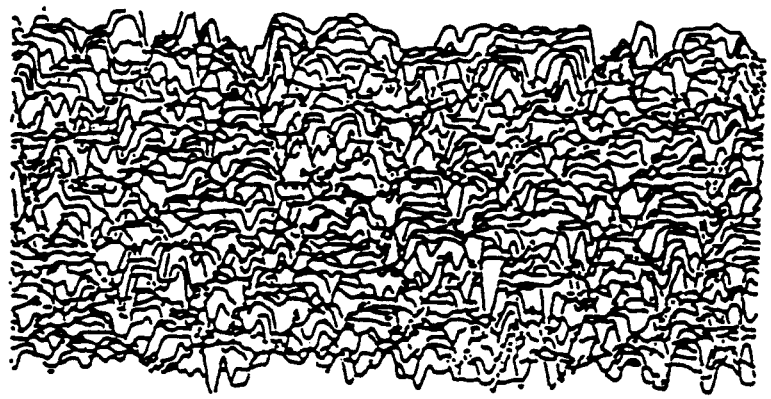
FIG. 9 is a view illustrating a film surface obtained by coating the base film of FIG. 8 with an adhesive at a spread rate of 1.5 g/m$^2$.

Furthermore, the surface structure of the base film of Comparative Example 1 before adhesive coating and the surface structure of the label of Comparative Example 1 after adhesive coating were examined. The surface structures determined are shown as drawings in FIGS. 8 and 9, respectively.

While the invention has been described in detail and with reference to specific embodiments thereof, it will be apparent to one skilled in the art that various changes and modifications can be made therein without departing from the spirit and scope thereof.

What is claimed is:

1. A method of preparing an in-mold label which comprises, embossing a resin film to form a gravure pattern comprising from 60 to 200 roll-formed lines per inch, stretching the embossed film, coating the stretched film on its embossed pattern side with a heat-sensitive liquid resinous adhesive in an amount of from 1 to 10 g/m² on a dry resin basis, and then drying the applied adhesive to form an adhesive layer on the film.

2. A method as claimed in claim 1, wherein said resin film contains an inorganic fine powder and forms microvoids by said stretching after said embossing.

3. A method as claimed in claim 1, wherein said adhesive layer has a Bekk's surface smoothness of from 20 to 800 seconds and an average three dimensional surface roughness (SRa) of from 0.5 to 5 μm.

4. A method as claimed in claim 1, wherein said embossed pattern after said stretching consists of top parts defined as those parts of the embossed film surface which are elevated above a center line which is the imaginary line extending at an equal distance from the tops and the valleys of the pattern and of valley parts defined as those parts of the embossed film surface which are depressed below the center line, said top parts having a surface area comprising from 50 to 90% of the area of all the embossed film surface, said valley parts having an average depth as measured from the center line of from 1 to 15 μm.

* * * * *